Sept. 30, 1958 — E. J. G. LAMMENS — 2,854,239
CHUCK
Filed July 11, 1955 — 2 Sheets-Sheet 1

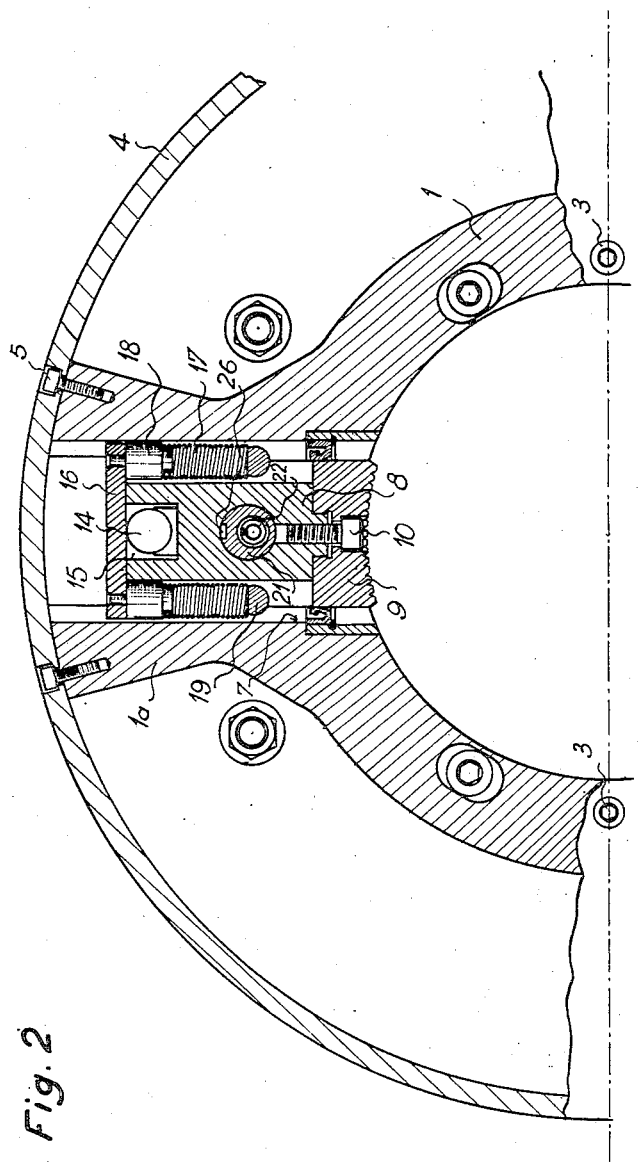

United States Patent Office 2,854,239
Patented Sept. 30, 1958

2,854,239

CHUCK

Eduard Johannes Gustave Lammens, Brussels, Belgium, assignor to Societe Anonyme dite: Le Progres Industriel, Lot (Lez Bruxelles), Belgium Application July 11, 1955, Serial No. 522,134

4 Claims. (Cl. 279—119)

The chucks of machine tools are driven most often by jacks. In certain cases the chucks rotate with the spindle, which necessitates the provision of rotating joints. In other cases the jacks do not rotate, which avoids the use of such joints, but the movement of the jack is then transmitted to the chuck by bearings or rollers. The force exerted by the jacks on these bearings or rollers causes a relatively rapid wear of the latter.

The present invention has for its subject a chuck driven by a non-rotating jack, which is improved in a manner so as to remedy the above indicated disadvantage.

The chuck according to the invention is characterized by the fact that it carries means for blocking the jaws in the position of locking.

In these conditions one can suppress the pressure on the driving jack or jacks once the locking is made. Thus one avoids all wear of the transmission rollers or bearings.

Preferably the jack for driving the chuck is adapted for unblocking the jaws at the time of its return.

The blocking can be formed, for example, by elongated rods or elements movable obliquely in the jaw supports and subjected to the action of springs tending to engage them to the chuck against a coaxial annular stop.

In this case, in order to ensure the unblocking of the jaws, one can provide movable fingers or lugs the movement of which is controlled by the jack and which are adapted to push back the said blocking rods at the time of the return of the jack.

In a preferred form of embodiment of the invention the control device of the jaws of the chuck carries pivoting levers, which drive the jaw carrier and are themselves driven by the jack by means of a cam system.

There is advantageously provided a sleeve mounted slidingly on a tubular support mounted on the spindle. This sleeve is connected with the jack and carries fingers cooperating with a surface forming the cam on the levers.

The pivoting levers can be supported by a support fixed to the spindle or by a support floating in relation to the latter. In the latter case the jaws themselves are floating and are put automatically into position even if the piece to be locked has a certain eccentricity in relation to the spindle.

These will now be described by way of non-limiting example, one method of embodiment of the invention with reference to the accompanying drawings, in which:

Fig. 2 is a view in elevation with partial axial section.

Figure 1:
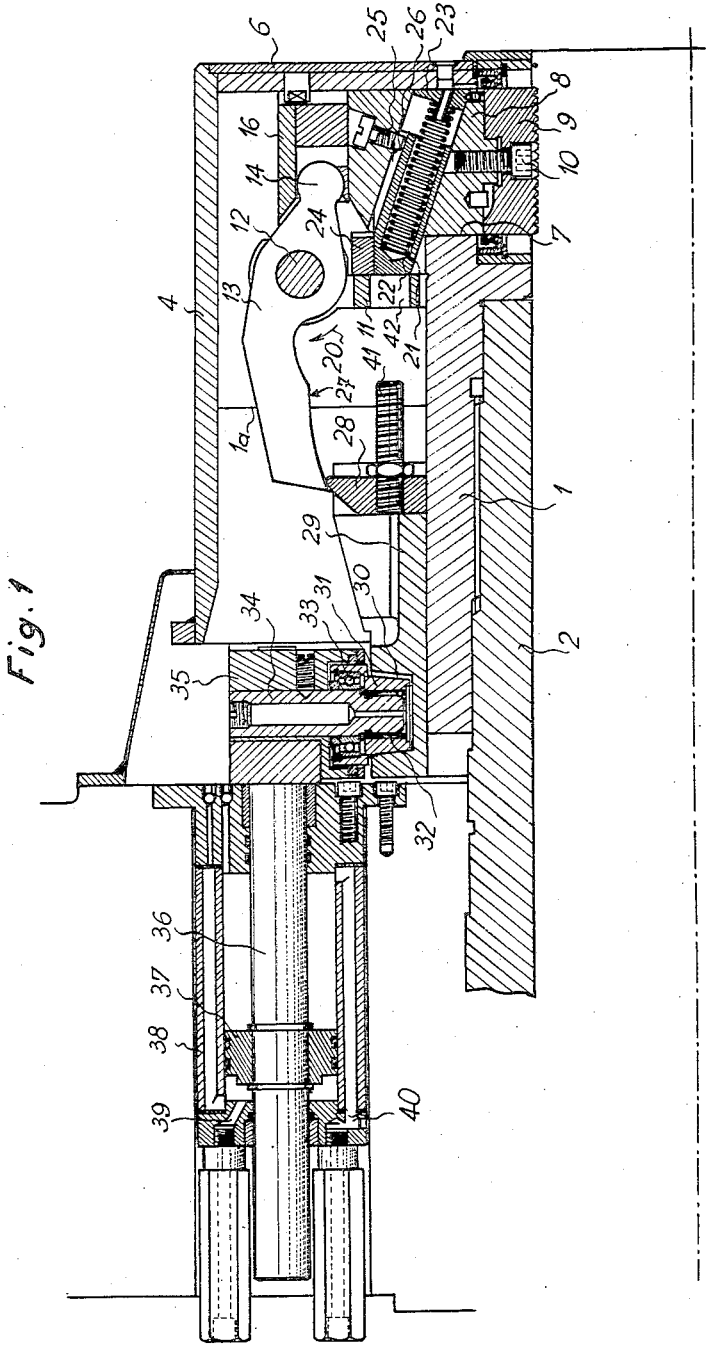
Fig. 1 is a view in axial section of the chuck.

As is shown on the drawing the chuck comprises a tubular support 1, which is threaded on the spindle 2 and is fixed to it by bolts 3. This support is rotated by a cylindrical casing 4, which is fixed to the support by screws 5 and is closed by a plate 6.

The support 1 is fixed at its front part by radial bosses 1a, three of which are provided in the shown example, and each having a cavity 7, in which a jaw carrier 8 is sliding-radially mounted, the jaw 9 being fixed to the latter by a bolt 10.

A ring 11 fixed on the support or mounted floatingly in relation to the latter, carries pivots 12 for the levers 13. The front end of each lever 13 is in the form of a toggle joint 14 and engaged in a cavity 15 of a jaw carrier being held by a small plate 16 fixed to this jaw carrier. Springs 17 interposed between stops 18 held by the small plates 16 and rods 19 with a section which has one side thicker than the other, fixed to the support 1 tend to displace the jaws in the direction corresponding to unlocking. The pivoting of the levers 13 in the direction of the arrow 20 thus causes the locking of the jaws 9 on the piece to be held, the springs 17 being opposed to this locking.

There is slidingly mounted in each jaw carrier 8 a holder 21 inclined in relation to the axis of the spindle 1, its rear end being higher than its front end. There is located in the interior of this holder a spring 22, which is supported on a fixed stop 23 and tends to conduct the rear end of the holder into contact with the internal wall of a fixed ring 24. A screw 25 fixed in the jaw holder 8 has its end engaged in a longitudinal groove 26 of the holder 21 in order to prevent this latter from pivoting.

The inclination of the holder 21 having been suitably chosen the displacement of the jaw carrier 8 in the direction corresponding to the locking permits the holder 21 to slide under the action of the spring 22, which lays the rear end of the said holder against the ring 24, which blocks the jaw in its position of locking. The inclination of the holder permits of obtaining a blocking whatever the exact position of locking may be.

The part of each lever 13 opposite to the toggle joint 14 has its lower surface 27, which is in the form of a cam and cooperates with a finger 28 fixed on a sleeve 29. This sleeve 29 is mounted slidingly on the support 1 and is furnished with an annular throat 30 in which the rollers 31 are engaged, to the number of three in the example shown. The number of rollers is independent of the number of jaws.

Each roller 31 is carried by means of bearings 32 and 33 by a pivot 34, which is fixed to a head joined to the end of the rod 36 of a piston 37 sliding in a cylinder 38 of the jack. Communicating with this cylinder, one on each side of the piston, are two fluid pipes 39 and 40, connected by means of a distributor, not shown, to the source of motive fluid and to the exhaust.

The sleeve 29 also carries three fingers 41, each of which is disposed opposite one of the holders 21 and can push back this holder in passing through an aperture 42 provided in the ring 11 for this purpose.

In order to lock the jaws on to the piece to be held the motive fluid is supplied into the jacks 38 through the pipes 40. The pistons 37 then move towards the left of the figure in carrying along the sleeve 29. The fingers 28 carried by the sleeve act on the surfaces in the form of a cam 27 of the levers 13 in order to make these latter turn in the direction of the arrow 20; the jaws then approach the axis of the chuck to lock the piece. At the time of this movement the holders 21 recede into the jaw holders under the action of the springs 22 to prevent the recoil of these jaw carriers.

The jaws 9 being blocked in the locking position one can suppress the pressure of the motive fluid on the piston 37. The rollers 31 then being no longer kept in contact with the groove 30, one eliminates all wear of the rollers and of this groove.

In order to unlock the chuck the motive fluid is supplied into the jacks 38 through the pipes 39, which causes a movement of the sleeve 29 towards the right in Fig. 1, At the beginning of this movement the jaws remain locked, but when this sleeve reaches the neighbourhood of the end of its path, the rods 41 strike on the holders 21 and push them back, which releases the jaw carriers, which then come away from the piece under the action of the springs 17.

As indicated above the ring 11 can be fixed to the support 1, for example, by bolts. The ring 11 can equally be fixed in a floating manner on to the support, which permits of locking the pieces having a certain eccentricity in relation to the spindle.

The invention is not limited to the method of embodiment described and shown and modifications may be made to it without departing from the scope of the present patent.

I claim:

1. A chuck device comprising a support, jaws movable in said support between positions for allowing the insertion of a work piece and for gripping the work piece, control means for controlling the positions of said jaws, piston and cylinder means for operating said control means, and stop means selectively coupling said jaws to said support for automatically locking said jaws in the positions at which the work piece is gripped, said stop means being responsive to said piston and cylinder means for releasing said jaws from the gripping positions.

2. A device as claimed in claim 1 wherein said control means comprises a pivoted lever for moving each jaw and a finger coupled to the piston and cylinder means for pivoting said lever.

3. A device as claimed in claim 1 wherein each jaw defines an aperture, said control means comprising a fixable member, said stop means comprising a spring in said aperture and a holder urged outwardly from said aperture by said spring for engaging said member in the various positions of the jaw for holding the jaw in its gripping position.

4. A device as claimed in claim 3 wherein said support is rotatable.

References Cited in the file of this patent

UNITED STATES PATENTS

| | | |
|---|---|---|
| 1,057,097 | Smith | Mar. 25, 1913 |
| 1,413,330 | Grace | Apr. 18, 1922 |
| 2,158,490 | Webster | May 16, 1939 |
| 2,617,657 | Smith | Nov. 11, 1952 |
| 2,733,071 | Renoux | Jan. 31, 1956 |

FOREIGN PATENTS

| | | |
|---|---|---|
| 915,768 | Germany | July 29, 1954 |